United States Patent [19]

Demirel et al.

[11] 4,328,037
[45] May 4, 1982

[54] PROCESS OF PRODUCING HYDRAULIC CEMENT FROM FLY ASH

[75] Inventors: Turgut Demirel; Dah-Yinn Lee; Mustafa Boybay, all of Ames, Iowa

[73] Assignee: Iowa State University Research Foundation Inc., Ames, Iowa

[21] Appl. No.: 220,993

[22] Filed: Dec. 29, 1980

[51] Int. Cl.$^3$ .................................. C04B 9/04
[52] U.S. Cl. .................. 106/85; 106/DIG. 1
[58] Field of Search .......... 106/85, DIG. 1; 501/155

[56] References Cited

U.S. PATENT DOCUMENTS 3,804,651  4/1974  Semler ..................... 106/85

FOREIGN PATENT DOCUMENTS 334202  4/1972  U.S.S.R. ................... 106/85

Primary Examiner—James Poer

[57] ABSTRACT

A hydraulic cement is prepared by reacting coal fly ash with concentrated phosphoric acid, and crushing or grinding the resulting mixture to granules or a fine powder. The reacted fly ash may be heated to reduce the water of hydration before final crushing or grinding. The resulting hydraulic cement may be mixed with sand and/or gravel aggregate to prepare mortar or concrete mixes for applications similar to Portland cement, or the fly ash cement may be mixed with soils to stabilize them.

7 Claims, No Drawings

PROCESS OF PRODUCING HYDRAULIC CEMENT FROM FLY ASH

BACKGROUND AND PRIOR ART

The field of this invention is hydraulic cements, such as Portland cement. Heretofore, fly ash has been used as a cementing material in admixture with lime, or lime and soil, or similar mixture, but has not been converted to a hydraulic cement with properties similar to Portland cement.

It is known that phosphoric acid can be used for stabilization of soils, especially clay-type soils. See Demirel, et al., *Proc. Iowa Academy of Sciences*, 65, 311–316 (1958); and *Highway Research Board Bulletin* 318, "Soil Stabilization with Phosphorus Compounds and Additives," National Academy of Sciences—National Research Council, Washington, D.C. (1962). Demirel, et al. proposed that the cementing substance formed from the clay soils was a gel, and that since the formation of the gel must take place in solution, moist curing of the phosphoric acid treated soil was essential. Lyons, et al described the cementing substance as being formed from reaction of the phosphoric acid with the aluminosilicates of the clay. *Highway Research Board Bulletin* 318, page 13. Hemwall, et al. proposed that the cementing compound was a dihydroxy aluminum dihydrogen phosphate having the general formula $Al(OH)_2H_2PO_4.xH_2O$. *Highway Research Board Bulletin* 318, page 36. However, no generally accepted setting mechanism for the reaction of phosphoric acid with clay soils has been elucidated.

SUMMARY OF INVENTION

Coal fly ash is produced as a by-product in the burning of pulverized coal. It is recovered from the flue gases. Fly ash is therefore a low cost material which is available in large quantity, but relatively few large scale commercial uses have been developed. With the increasing burning of coal to produce electrical energy, the amount of available fly ash can be expected to continually increase, and therefore processes using fly ash as a starting material will be increasingly important. The principal constituents of fly ash are the oxides of aluminum, iron, calcium, and silicon ($Al_2O_3$, $Fe_2O_3$, CaO, and $SiO_2$). It has been discovered that a high strength cement can be produced by reacting fly ash with concentrated aqueous phosphoric acid ($H_3PO_4$). The finely divided particulate fly ash becomes aggregated during the reaction and forms large lumps. These lumps are then crushed or ground to a granular mixture or a fine powder to obtain a hydraulic cement, which on mixing with water, and mineral aggregates (e.g., sand or gravel) will set to a high strength. This hydraulic cement has properties and applications similar to Portland cement. It may also be mixed with soils for soil stabilization applications.

DETAILED DESCRIPTION

The process of this invention is generally applicable to coal fly ashes which are recovered from flue gases in the burning of pulverized coal. For example, the fly ash may be derived from bituminous, subbituminous, or lignite coals. Although the exact composition of such fly ashes will vary with respect to the relative proportions of the principal oxides, such fly ashes can be characterized as containing $Al_2O_3$, $Fe_2O_3$, CaO, and $SiO_2$ as the principal constituents. For example, such fly ashes may contain by weight from 15 to 28% $Al_2O_3$; 2 to 22% $Fe_2O_3$; 2 to 28% CaO; and 30 to 60% $SiO_2$. For the purpose of the present invention, it is preferred to employ fly ashes of relatively low CaO content, while containing relatively large amounts of $Al_2O_3$ and $Fe_2O_3$. In general, such preferred fly ashes will contain at least 30% by weight of $Al_2O_3$ plus $Fe_2O_3$, and the amount of CaO will be less than 6%. Although such fly ashes are believed to produce hydraulic cements of the greatest strengths by the process of this invention, other fly ashes can be used.

The other principal starting material is concentrated aqueous phosphoric acid, such as commercial grade 85% $H_3PO_4$. In general, phosphoric acid should contain not over 30% water by weight. Although not as convenient as concentrated aqueous phosphoric acid, 100% $H_3PO_4$ can be used. In general, the phosphoric acid reactant will contain from 70 to 100% $H_3PO_4$ by weight, and in preferred embodiments, will contain from about 80 to 90% $H_3PO_4$ by weight. Relatively impure grades of phosphoric acid can be used, such as those produced from low grade phosphate rock, and therefore the low cost of the starting material should make this process commercially attractive.

The amount of phosphoric acid to be employed for reaction with a particular fly ash has been developed empirically. For this purpose, an acidification value is calculated for the particular fly ash, which value is referred to herein as the Fly Ash Acidification Mole or FAA Mole. The FAA Mole is computed as two (2) times the total moles of $Al_2O_3$ and $Fe_2O_3$ in the amount of fly ash used plus ⅔ (0.67) times the moles of CaO therein. Using this calculated value, fly ash may be treated with a molar amount of $H_3PO_4$ equal to 0.6 to 2.0 times the Fly Ash Acidification Mole. In preferred embodiments, from 1.0 to 1.5 moles of $H_3PO_4$ is employed per FAA Mole.

The reaction can be carried out under relatively mild conditions such as 15° to 40° C. at atmospheric pressure. More broadly, the phosphoric acid may be reacted under atmospheric pressure at temperatures with the range from about −10° to 300° C. At higher temperatures, the mixture sets to an insoluble, very hard and strong solid porous mass, and loses its hydraulic properties with increasing temperature. Even higher temperatures such as up to 500° C. may be used for making bricks. While superatmospheric pressures can be employed, there is no advantage in doing so. Water vapor may be evolved during the reaction, depending on the temperature and pressure conditions employed, but this is not essential for the reaction. The amount of water present in the reaction is limited by the use of the highly concentrated phosphoric acid, and therefore there is no need to remove water during the reaction.

Carrying out the reaction, the particulate fly ash is mixed as a solid phase with the liquid phosphoric acid, suitable mixing equipment being employed, During the early stages of the reaction, the reaction mixture will be in the form of a slurry. As the reaction proceeds, the mixture will become thicker and will form large aggregates which will become united in the form of lumps. Therefore, in the latter stages of the reaction it will be desirable to employ solid phase-type mixing apparatus, such as apparatus performing both mixing and grinding to prevent the reaction mixture from setting up to a solid cake. The reaction time will depend on the temperature employed, but usually, the reaction will be sufficiently completed in about 1 to 3 days at ambient temperatures (15°–25° C.). By heating the reactants, the reaction time can be shortened to 1 to 3 hours. After the reaction mixture has been converted to an essentially solid phase of aggregates or lumps, it can be prepared as a hydraulic cement by the simple step of comminuting the aggregated material to a particulate form, such as by crushing or grinding. For example, grinding can be carried out to reduce the aggregates or clinkers to a fine powder similar to the powder form of other hydraulic cement such as Portland cement. The particle sizes should be less than ½ inch, and preferably smaller. For example, to facilitate utilization, the grinding may be continued until about 90% by weight of the product will pass through a 100 or 200 mesh screen (American Standard Screen Size). The product prepared as described above is a hydraulic cement which first disperses then sets by hydration on mixing with water regardless of its particle size distribution. It can be prepared as a mortar mix with sand, or as concrete in admixture with aggregates such as sand and gravel. Contrary to Portland cement, the fineness or coarseness of the fly ash-phosphoric acid cement does not effect the hydration. It only affects the mixing effort needed for preparation of mortar or concrete. The larger the particles of cement, the higher the mixing effort required for intimate mixing. High strengths are obtainable, being generally comparable to those of Portland cement.

Although the cementing compounds of the hydraulic cement have not yet been fully characterized, it appears that they are not simple compounds such as aluminum phosphate or iron phosphate. X-ray diffraction analysis of the hydraulic cement indicates that the cementing compounds are salts of $[Al_3H_{14}(PO_4)_8 \cdot 4H_2O]$ and $[Fe_3H_{14}(PO_4)_8 \cdot 4H_2O]$. The salt form is probably primarily calcium or magnesium although some sodium or potassium salts may be present. The compounds identified are those in the unhydrated cement and the form in which these compounds exist after hydration has not been determined. However, it is apparent that the products of the fly ash-phosphoric acid reaction are not completely hydrated, since they hydrate and set on the addition of water.

Although not essential for the purpose of the present invention, the reacted fly ash prior to final grinding may be heated to a high temperature to drive off excess hygroscopic water and water of hydration to improve its grindability. For example, reacted fly ash may be heated at a temperature of from about 100° to 300° C. for 1 to 3 hours. The heated product which will contain a reduced amount of hygroscopic water and water of hydration is then ground to the fine particle size to produce the more easily utilizable hydraulic cement product.

This invention is further illustrated by the following experimental examples.

EXAMPLE I

One part by weight of Ames, Iowa Power Plant Fly Ash having the composition given in Table A and FAA mole value of 0.008325 (see Table A for computation) was mixed thoroughly with 0.67 parts by weight (which corresponds to 0.7 of FAA mole, see the note to Table A.) of 85% $H_3PO_4$ in a 3 Kg capacity mixer for five minutes. The mixture was stored to complete the reaction for 3 days at room temperature. Several such mixtures were prepared to obtain enough material for testing. At the end of the third day the mixtures were crushed using a mortar and pestle (a hammer mill could also be used for this purpose) to a maximum particle size of ½ inch. The crushed mixture was divided into five parts. Each part was then mixed in the 3 Kg mixer with 0.2, 0.3, 0.4 and 0.5 parts of water, respectively, (corresponding to W/C water cement ratios of 0.2, 0.3, 0.4 and 0.5 to smooth paste consistencies (about 3 minutes). Each paste was immediately mixed with 2.50 parts of Standard Ottowa Sand; the sand was added in two equal increments while mixing continued for a total of 6 minutes. The mortar mixtures thus obtained were poured into cubic standard mortar molds (2×2×2 inch) and rodded according to ASM standard method C109. These mortar cubes were cured in a humid room (at a minimum of 90% relative humidity) for 1, 3, 7 and 10 days (during the first three hours of curing they were kept in molds for hardening). At the end of each curing period, two sets of cubes were removed for compressive strength tests. One set was tested immediately, and the other set after 3 days soaking in water. Test results are tabulated in Table B. Table B suggests that a W/C of 0.3–0.4 is appropriate to yield the high strength for the cement of this example.

TABLE A

CHEMICAL COMPOSITION OF AMES POWER PLANT FLY ASH

| COMPOSITION | $Al_2O_3$ | $Fe_2O_3$ | CaO | $SiO_2$ | FAA MOLES PER GRAM OF FLY ASH* | AMOUNT IN GRAMS EQUIVALENT TO FAA MOLES PER GRAM OF FLY ASH | |
|---|---|---|---|---|---|---|---|
| | | | | | | 100% $H_3PO_4$** | 85% $H_3PO_4$*** |
| PERCENT BY WEIGHT | 18.7 | 27.5 | 10.2 | 33.4 | | | |
| MOLES PER GRAM OF FLY ASH | | | | | | | |
| $\frac{Gram\ Wt.}{Gram\ Moles}$ | $\frac{0.187}{101.96} =$ | $\frac{0.275}{159.70} =$ | $\frac{0.102}{56.08} =$ | | | | |

TABLE A-continued
CHEMICAL COMPOSITION OF AMES POWER PLANT FLY ASH

| COMPOSITION | $Al_2O_3$ | $Fe_2O_3$ | CaO | $SiO_2$ | FAA MOLES PER GRAM OF FLY ASH* | AMOUNT IN GRAMS EQUIVALENT TO FAA MOLES PER GRAM OF FLY ASH | |
|---|---|---|---|---|---|---|---|
| | | | | | | 100% $H_3PO_4$** | 85% $H_3PO_4$*** |
| | 0.001834 | 0.001722 | 0.001819 | | 0.008325* | 0.816** | 0.96*** |

*FAA is defined as number of moles of $H_3PO_4$ needed to convert $Al_2O_3$, $Fe_2O_3$ and CaO present in fly ash to $AlPO_4$, $FePO_4$, $Ca_3(PO_4)_2$, respectively. The calculation is based on the following stochiometric equations: $Al_2O_3 + 2H_3PO_4 \rightarrow 2AlPO_4 + 3H_2O$; $Fe_2O_3 + 2H_3PO_4 \rightarrow 2FePO_4 + 3H_2O$; $CaO + \frac{2}{3} H_3PO_4 \rightarrow \frac{1}{3} Ca_3(PO_4)_2 + H_2O$. Therefore, for every mole of $Al_2O_3$, $Fe_2O_3$ and CaO present in fly ash 2,2 and $\frac{2}{3}$ moles of $H_3PO_4$ are required, respectively, to convert them into their phosphates. Thus, the number of moles of $H_3PO_4$ needed for one gram of the Ames Power Plant Fly Ash is: $2 \times 0.001834 + 2 \times 0.001722 + \frac{2}{3} 0.001819 = 0.008325$ which is the FAA moles for one gram of the fly ash.

**Amount of $H_3PO_4$ in gram quantities needed for one gram of fly ash can be calculated from FAA as follows $$0.008325 \frac{\text{moles}}{\text{gram Fly Ash}} \times \frac{97.97 \text{ gram } H_3PO_4}{1 \text{ mole } H_3PO_4} = 0.816 \frac{\text{gram } H_3PO_4}{\text{gram Fly Ash}}$$

***Amount of 85% $H_3PO_4$ equivalent to one gram of 100% $H_3PO_4 = \frac{1g(85\% H_3PO_4)}{0.85g(100\% H_3PO_4)} = \frac{1.18g(85\% H_3PO_4)}{g(100\% H_3PO_4)}$ Hence, grams of 85% $H_3PO_4$ equivalent to one gram of the Ames Power Plant Fly Ash is:

$$1.18 \frac{g(85\% H_3PO_4)}{g(100\% H_3PO_4)} \times 0.816 \frac{g(100 H_3PO_4)}{g \text{ Fly Ash}} 0.96$$

Note:
For this example, to save from the amount of $H_3PO_4$ and to illustrate computations, it was decided to prepare a cement using 70% of the $H_3PO_4$ needed to satisfy FAA moles of the fly ash. Since 0.96 grams of 85% $H_3PO_4$ is needed to satisfy 100% of FAA moles of the fly ash $$0.96 \times \frac{70}{100} = 0.67 \text{ g}(85_5 H_3PO_4) \text{ is needed for preparing the cement as planned.}$$

TABLE B
MORTAR STRENGTH TEST RESULTS

| WATER-CEMENT RATIO W/C | CURING TIME AT 90% HUMIDITY DAYS | COMPRESSIVE STRENGTH | |
|---|---|---|---|
| | | Dry, psi* | Soaked, psi |
| 0.2 | 1 | 1144 | 1680 |
| | 3 | 1315 | 1750 |
| | 7 | 1428 | 1432 |
| 0.3 | 10 | 1800 | 2460 |
| 0.4 | 1 | 1800 | No Specimen |
| 0.5 | 1 | 750 | 1125 |

*ASTM requires 800-3500 and 1000-2800 psi for various types of Portland cement mortars after 3 and 7 days curing, respectively, 1979 Annual Book of ASTM Standards, Part 14.

EXAMPLE II

Another mixture of $H_3PO_4$ and Ames Power Plant Fly Ash (with the same composition as the fly ash of Example I) was prepared using the same preparation procedures described in Example I. After storing for one day at room temperature this mixture was divided into two parts. The first part was heated at 100° C. and the second part at 200° C. for 3 hours. The part heated to 100° C. was crushed to a maximum size of ½ inch. The second part heated to 200° C. was again divided into two parts. The first part was crushed to a maximum size of ½ inch and the second part was ground in a ball mill to pass a 100 mesh sieve. The three fly ash phosphoric acid cements thus prepared were used to make mortar mixes with a water cement ratio of 0.4 and the sand content of 2.50 parts per part of cement as described in Example I. These mortar mixes were then molded and cured again as described in Example I. Test results are tabulated in Table C. Results suggest that heating of fly ash—$H_3PO_4$ mixture of this example does not improve cementing properties.

TABLE C
STRENGTH RESULTS OF MORTARS PREPARED BY USING HEATED CEMENTS

| FLY ASH - $H_3PO_4$ CEMENT | | CURING TIME AT 90% HUMIDITY DAYS | COMPRESSIVE STRENGTH | |
|---|---|---|---|---|
| Heated at °C. | Maximum Part. Size | | Dry, psi | Soaked, psi |
| 100 | ½ inch | 1 | 420 | 425 |
| | | 7 | 455 | 1000 |
| 200 | ½ inch | 3 | 150 | 175 |
| 200 | 100 mesh | 3 | 385 | 340 |

EXAMPLE III

One part of the fly ash and 0.1 part of 85% $H_3PO_4$ (about 0.1 of FAA moles) by weight were thoroughly mixed in a Kitchenaid mixer (about 5 minutes). Portions of the mixture were then molded into 2 inch diameter×2 inch high cylindrical specimens by placing them into cylindrical molds and compacting them by dropping a five pound weight five times on each end from a height of 18 inches. After molding samples were extruded from the molds using a jack. The extruded samples were stored at room temperature for one day. They were then heated to 500° C. for three hours in a muffle furnace. After cooling half of the samples were tested for compressive strength. The other half were soaked in water for three days and then tested for compressive strength. The test results are tabulated in Table D. These results suggest that bricks and blocks can be made from fly ash with low levels of $H_3PO_4$ treatment at relatively low temperatures.

TABLE D

| 85% $H_3PO_4$: Fly Ash Weight Ratio | Compressive Strength | |
|---|---|---|
| | Dry, psi | Soaked, psi |
| 0.1:1 | 625 | 850 |

EXAMPLE IV

The mortar mixture of Example I with the water-cement ratio of 0.3 was prepared to be used as a masonry mortar. This mortar mixture was tested for Bond Strength of Mortar to Masonry Units according to ASTM Standard Test Method E-149-76 using bricks. Results of the tests are given in Table E. These results suggest that fly ash-phosphoric acid cement can make excellent masonry mortars.

TABLE E

BOND STRENGTH OF MORTAR-BRICK INTERFACE
Bond Strength, lbs*

| After 3 Days | After 7 Days |
|---|---|
| 350 | 370 |

* Maximum bond strength expected from ordinary mortar is about 100 lbs.

EXAMPLE V

Concrete mixtures may be designed using the fly ash—$H_3PO_4$ cements of this invention in a manner similar to the mix design of Portland cement concrete.

The goal of mix design is to fill the total volume that will be filled by concrete with the ingredients of concrete i.e., coarse aggregate, fine aggregate, cement and water. Design tables for Portland cement concrete give the appropriate quantities of these ingredients, Design and Control of Concrete Mixtures, Portland Cement Association, 1968. For a water cement ratio of 0.4 these quantities are: coarse aggregate 1940 lbs. (68% of total aggregate), fine aggregate 910 lbs. (32% of total aggregate), Portland cement 815 lbs. and water 325 lbs. To adapt this to fly ash $H_3PO_4$ cement, we should calculate the amount of fly ash—$H_3PO_4$ cement that will occupy the same volume as Portland cement. Quantities per cubic yard:

Volume of Portland cement = $\frac{815}{\text{Density of Portland cement}} = \frac{815}{3.15 \times 62.4}$ This should be equal to: $\frac{\text{Amount of fly ash-}H_3PO_4\text{ acid cement }(x)}{\text{Density of fly ash }H_3PO_4\text{ cement}} =$ $\frac{X}{3.00 \times 62.4} \quad X = \frac{3.00}{3.15} \times 815 = \frac{776 \text{ lbs}}{}$ Amount of water = w/c ratio × 776 = 310 lbs.
Reduction in volume due to reduction in water = (325−310)/62.4 = 15/62.4 = 0.024 cubic feet
This should be made up by increasing amounts of aggregates in proportion:

Volume of Aggregate: $\frac{\text{Wt. of agg.}}{\text{Density of Agg.}} = \frac{X^*}{2.70 \times 62.4}$
$y = 0.24 \times 2.70 \times 62.4 = 40.43$ lbs.

*Specific gravity of fly ash - $H_3PO_4$ cement ranges 2.70-3.10. Aggregate 5 sp.gr. range 2.65-2.75.

Additional coarse aggregate = 40.43 × 0.68 = 27.5 lbs.
Additional fine aggregate = 40.43 × 0.32 = 12.9 lbs.
Therefore design mix per cubic yard should be made with:
1967.5 lbs.—coarse aggregate
922.9 lbs.—fine aggregate
776 lbs.—fly ash $H_3PO_4$ cement
310 lbs.—water Recommended mixing procedure: Mix fly ash—$H_3PO_4$ cement and water for 3 minutes add ½ of coarse aggregate. Mix for 3 minutes. Add fine aggregate. Mix for 3 minutes. Add rest of coarse aggregate. Mix for 3 minutes in a concrete mixer to complete preparation.

We claim:
1. The process of producing a hydraulic cement from particulate coal fly ash containing $Al_2O_3$, $Fe_2O_3$, CaO and $SiO_2$ as the principal constituents, comprising:
   (a) reacting phosphoric acid ($H_3PO_4$) with said fly ash, said $H_3PO_4$ containing not over 30% water by weight and being employed in a molar ratio of 0.6 to 2.0 moles of $H_3PO_4$ per Fly Ash Acidification Mole (FAA Mole), said FAA Mole being computed as two times the total moles of $Al_2O_3$ and $Fe_2O_3$ in the amount of fly ash used plus 0.67 times the moles of CaO therein;
   (b) continuing said reaction until the fly ash is converted to an aggregated hydraulic cement; and
   (c) comminuting said cement aggregates to a particulate form to facilitate use as a cement.

2. The process of claim 1 in which at least 30% by weight of said fly ash is $Al_2O_3$ plus $Fe_2O_3$ and the amount of said CaO is less than 6% by weight.

3. The process of claim 1 in which said ratio is 1.0 to 1.5 moles of $H_3PO_4$ per FAA Mole.

4. The process of claim 1, claim 2, or claim 3 in which said phosphoric acid is aqueous phosphoric acid having a concentration of from 80 to 90% $H_3PO_4$ by weight.

5. The process of producing a hydraulic cement from particulate coal fly ash containing $Al_2O_3$, $Fe_2O_3$, CaO, and $SiO_2$ as the principal constituents, comprising:
   (a) reacting phosphoric acid ($H_3PO_4$) with said fly ash, at least 30% by weight of said fly ash being $Al_2O_3$ plus $Fe_2O_3$ and the amount of said CaO being less than 6% by weight; said $H_3PO_4$ containing not over 30% water by weight and being employed in a molar ratio of 1.0 to 1.5 moles of $H_3PO_4$ per Fly Ash Acidification Mole (FAA Mole), said FAA Mole being computed as 2 times the total moles of $Al_2O_3$ and $Fe_2O_3$ in the amount of fly ash used plus 0.67 times the moles of CaO therein;
   (b) continuing said reaction until the fly ash is aggregated into large lumps; and
   (c) comminuting said lumps to a maximum particle size of ½ inch to obtain said hydraulic cement.

6. The process of claim 5 in which said phosphoric acid is aqueous phosphoric acid having a concentration of from 80 to 90% $H_3PO_4$ by weight.

7. The process of claim 4, claim 5, or claim 6 in which said comminuting produces a hydraulic cement having a particle size such that at least 90% by weight passes through a 100 mesh screen (American Standard Screen Size).

* * * * *

UNITED STATES PATENT OFFICE
CERTIFICATE OF CORRECTION

Patent No. 4,328,037          Dated May 4, 1982

Inventor(s) Turgut Demirel, Dah-Yinn Lee, Mustafa Boybay

It is certified that error appears in the above-identified patent and that said Letters Patent are hereby corrected as shown below:

Table A, columns 5 and 6, in the second line of the single asterisk footnote, correct "1/3 $Ca_3(PO_4)$" to read - 1/3 $Ca_3(PO_4)_2$-; in the calculation of the triple asterisk footnote change "g(100 $H_3PO_4$)" to read -g(100 % $H_3PO_4$)-; in same calculation change "0.96" to read - = 0.96 -; and in the last line of the "Note:" delete the subscript "5" after "85"; column 7, lines 42 and 43 cancel "(3-25) and substitute -(325-; column 7, line 43 change "0.024" to -0.24-; column 7, line 49 change "y" to -x-; column 7, line 50 delete the "5" before "sp.gr."; and column 8, lines 20-21 change "convented" to -converted-.

*Signed and Sealed this*

*Twenty-sixth* Day of *October 1982*

[SEAL]

Attest:

Attesting Officer

GERALD J. MOSSINGHOFF
*Commissioner of Patents and Trademarks*